2,986,970
ADJUSTABLE SPECTACLES
Vernon E. Kilgour, West Boylston, and Louis J. Furman, Worcester, Mass., assignors to Ruth Edwards Kilgour, West Boylston, Mass.
Filed Oct. 13, 1958, Ser. No. 766,826
1 Claim. (Cl. 88—41)

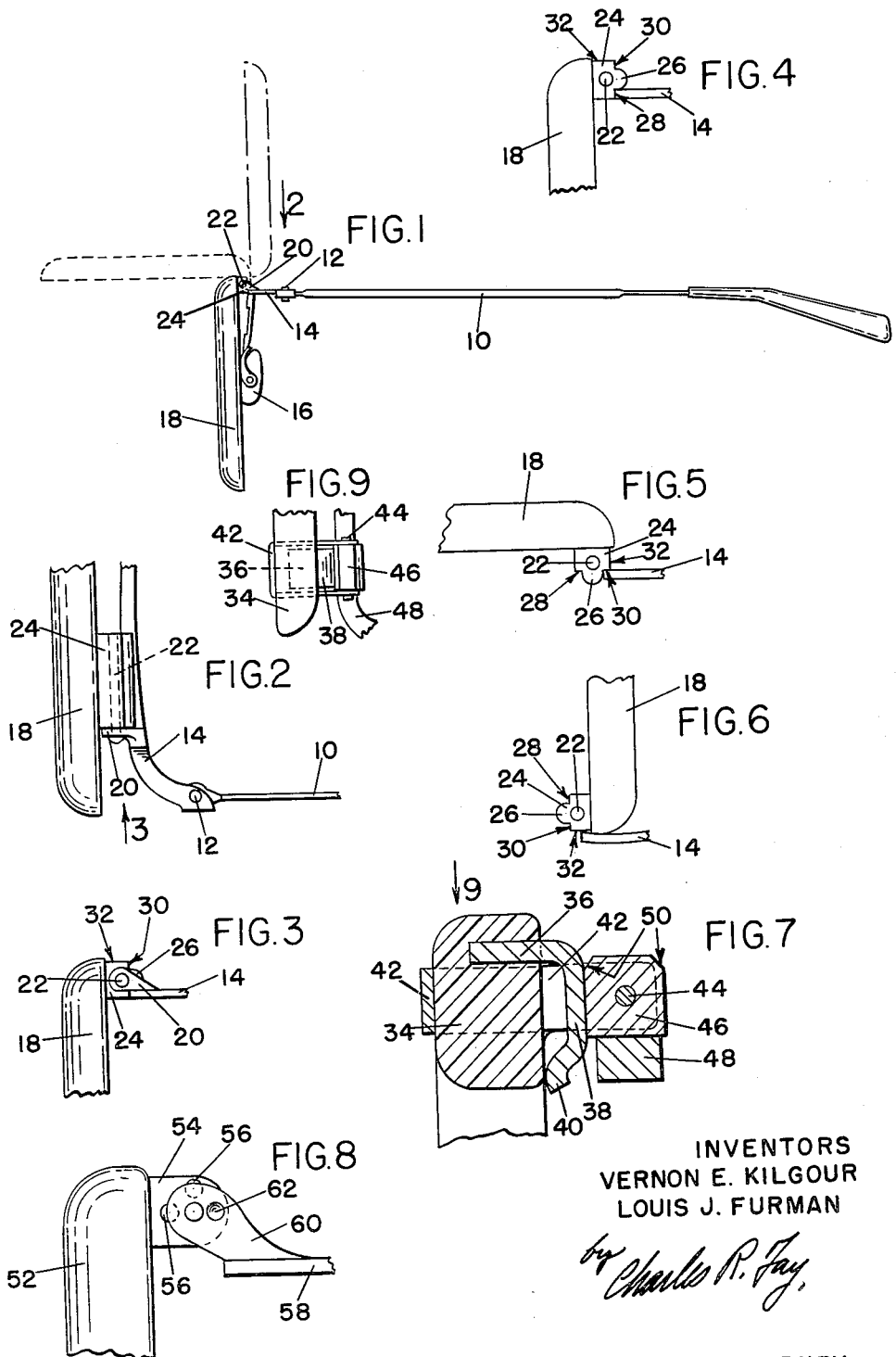

This invention relates to a new and improved spectacle construction, and the principal object of the invention resides in the provision of a new and improved spring hinge connection for the mounting on the bow of a spectacle frame in combination with a rotatably adjustable lens frame mounted thereon for holding the lens frame alternatively in viewing position, i.e., with the lenses in operative relationship with respect to the eyes of the user, or in outstanding relationship thereto where the lenses are not in use; and the provision of a spectacle frame as above described including if desired a third position wherein the frame including the lenses may be located in a completely 180° reversed position in the region of the forehead of the user, in the event that it is desired that the lenses be completely out-of-the-way.

A further object of the invention resides in the provision of a new and improved spring hinge construction for ease and simplicity of manufacture and sturdiness and long wearing qualities in use including a spectacle frame having temples and a bow, together with a nose-piece but without any lenses, in combination with a rotatable lens frame (and lenses) mounted on the bow of the spectacle frame and having at least two and in some cases three substantially positive locations of adjustment, i.e., in operative use, in a position substantially at 90° thereto, and in a position at 180° for placing the lenses completely out-of-the-way of the eyes of the user.

Other objects and advantages of the invention will appear hereinafter.

Reference is to be had to the accompanying drawings, in which

FIG. 1 is a view in side elevation illustrating the invention;

FIG. 2 is a plan view on an enlarged scale, looking in the direction of arrow 2 in FIG. 1;

FIG. 3 is a view in elevation, looking in the direction of arrow 3 in FIG. 2;

FIGS. 4, 5 and 6 are diagrammatic views illustrating the hinge action;

FIG. 7 is a sectional view on an enlarged scale illustrating a modification;

FIG. 8 is a view similar to FIG. 7 illustrating a still further modification; and FIG. 9 is a plan view, looking in the direction of arrow 9 in FIG. 7, this view being on a smaller scale.

Many people find it necessary to use reading glasses for close-up work and reading, but do not need correction of vision for objects at a distance. Glasses have been made in the past for accommodating this deficiency but in many cases the same have been generally unsatisfactory because of lack of ease in use or flimsiness of construction. It is found that particularly when viewing television, a person who desires to read or do close work at certain points of the program needs the corrected lenses for accomplishing this purpose; but at the same time when desiring to look at the TV screen, the corrective lenses must be removed and set aside. This invention provides an adjustable spectacle frame which may be maintained upon the head in the usual fashion at all times and by means of the new and improved construction herein the corrective lenses may be utilized in the normal manner or flipped up out-of-the-way at a moment's notice for vision at a longer range.

Referring now to FIGS. 1 and 2, there is shown a temple 10 which may be of any desired or convenient construction, preferably pivoted as at 12 to a metal bow 14, said bow extending to the other temple and mounting a nose-piece as is usual thereon. A conventional nose-piece is indicated at 16 herein and this nose-piece as well as the temples may assume any conformation desired or convenient and do not form a part of the present invention except insofar as the same cooperate in combination with the novel hinge of the present invention.

The frame 18 is adapted to contain the corrective lenses and as shown in dotted lines in FIG. 1 this frame is hinged with respect to the bow 14 and is adapted to assume the useful solid line position shown in FIG. 1, the dotted line position showing the same at right angles thereto, or the broken line position showing the same in full reversed position with respect to the useful position, being completely out-of-the-way adjacent the forehead of the user.

The bow 14 is springy and is provided at appropriate points with two hinge-leaves or the like indicated at 20. Each hinge-leaf is provided with a hinge pintle 22 which extends through a pivot block 24. This pivot block is preferably more or less rigidly and permanently mounted at the rear of frame 18, and in the particular case herein, there is a single pivot plate 20 for each block 24, which leaves the springiness of the bow 14 free to come into play as will be described hereinafter.

The block 24 is conveniently provided with a rearwardly extending longitudinal ridge or the like 26 which leaves a pair of shoulders or depressions 28 and 30, these shoulders or depressions being separated by the longitudinal ridge. The ridge 26 is in general parallelism with the forward edge of the resilient bow 14 and is normally in contact therewith.

Referring now further to FIG. 4, it will be seen that the shoulder or depression 28 is engaged with the upper left-hand corner of the resilient metal bow 14 and this therefore resiliently or yieldingly maintains the spectacle frame 18 at the position shown in FIG. 4, i.e., in a depending useful position with respect to the eyes of the user.

However, if it is desired to flip the frame 18 upwardly to the FIG. 5 position, it is merely necessary to apply a slight rotative pressure to the frame 18 to move the same in a clockwise direction from the FIG. 4 to the FIG. 5 position. In this case, the ridge 26 will slightly depress the resilient bow-piece 14 and the corner of the latter will then snap into the shoulder or depression at 30, holding the frame 18 generally horizontally as shown in FIG. 5.

Also, the block 24 may be provided with an upper generally flat surface 32 if desired and this may be utilized to hold the lens frame 18 in the upward position of FIG. 6, it being remembered that the bow 14 is resilient enough not only to allow the adjustment recited above, but also to hold the frame 18 definitely in the respective positions of adjustment in these locations. The fact that the ridge 26 is rounded makes it difficult to maintain the frame 18 in any position between that of FIG. 4 and that of FIG. 5, and it is the tendency of the novel hinge construction to provide for the almost automatic action snapping the edge of the resilient bow-piece 14 into the respective notch as above described. Hence the glasses are held either in the useful position in a positive manner or in the out-of-the-way position of FIG. 5 also in an equally positive manner. The same thing is true as to the position shown in FIG. 6, although here the depressions or shoulders are not utilized but the flat 32 is utilized for the same purpose.

In the modification shown in FIG. 7, the frame holding the lenses is indicated at 34 and it has embedded therein as at 36 a spring member having a portion thereof at 38 spaced from the frame 34 together with a free-ended portion 40 which re-entrantly bears upon the same as clearly shown by this figure.

Also frame 34 may be provided with a U-shaped plate or the like 42 which passes through the frame 34 and extends to the rear, forming a support for a hinge pintle 44, the latter passing through a hinge-block or the like 46 attached to bow 48 which is similar to that at 14. The hinge block 46 may be provided with beveled corners as at 50, in order to facilitate the action.

In this case, the action is somewhat the same but the spring member at 38 rides on the flat surfaces of the hinge block and therefore yields enough to allow the same adjustment as above described, but the hinge bears on the three different flat sides of the hinge block 46 to yieldingly hold the spectacles in their downward useful position or selectively in either of the other two un-used positions thereof. Also, the U-shaped hinge plate 42 forms an ornamental appearance at the forward portion of the bow and it is to be understood of course that this construction is duplicated at the other side of the bow as described above.

In FIG. 8 there is shown a further modification wherein the lens frame at 52 is provided with a hinge plate at 54 and this hinge plate has a series of depressions therein as at 56, 56, etc. There may be either two or three of these depressions. The bow-piece at 58 is provided with a hinge plate 60 in which there is a depression or dimple 62 and this snaps into any one of the various depressions 56 in order to hold the lens frame 52 in the various positions described above.

It will be seen that this invention provides a very simple but strong, sturdy and long-lasting adjustable spectacle frame of the class described wherein the lens frame may be flipped up or down at an instant's notice as desired while positively holding the same in these positions, in contra-distinction to constructions using friction hinges or similar means for a similar purpose. This is a forward step in the art due to the fact the present construction is inexpensive to manufacture, easy to use, and positive in its operation and long-lasting and rugged so that it may be used as often as desired without wearing out or suffering any damage thereto.

This invention provides TV spectacles or TV glasses which are particularly advantageous for this purpose as the user is enabled to read at his leisure from a point across the room from the television screen and at the same time merely by flipping the spectacles from one position to another is enabled to look at the picture on the TV screen almost instantaneously changing from one to the other. In the absence of these TV spectacles, a person would have to have bi-focal lenses in order to accomplish the same purpose or else the reading glasses would have to be completely removed. It is easily seen that with the present TV glasses, however, the change from reading to viewing the screen is made very quickly and easily without any particular effort or time interval of change involved.

Having thus described our invention and the advantages thereof, we do not wish to be limited to the details herein disclosed, otherwise than as set forth in the claim, but what we claim is:

An adjustable spectacle frame comprising a temple and a resilient bow connected thereto, a lens frame pivotally mounted on said bow on an axis generally parallel to the bow, a hinge block on the lens frame, and interengaging means between said hinge block and said lens frame for yieldingly maintaining the lens frame in alternate positions for use and non-use thereof, said bow frame by its resilience constantly engaging said hinge block and tending to hold the same in its adjusted position, said interengaging means including shoulders or depressions on said hinge block, said resilient bow snapping into the same and holding the same in desired position of adjustment of the lens frame, and a flat on said hinge block, said flat being on the top surface thereof when the lens frame is in its downward useful position but resiliently contacting the top portion of the bow when the lens frame is at 180° adjusted position with respect to the original position.

References Cited in the file of this patent

UNITED STATES PATENTS

| | | |
|---|---|---|
| 505,650 | Francis | Sept. 26, 1893 |
| 868,857 | Garner | Oct. 22, 1907 |
| 1,181,291 | Clarke | May 2, 1916 |
| 1,517,009 | Kniffen | Nov. 25, 1924 |
| 1,545,281 | Royak | July 7, 1925 |